United States Patent [19]

Yoneda et al.

[11] Patent Number: 4,709,509

[45] Date of Patent: Dec. 1, 1987

[54] NUMERICALLY CONTROLLED GRINDING MACHINE

[75] Inventors: Takao Yoneda, Nagoya; Tadashi Ogasawara, Toyoda; Norio Ohta, Okazaki; Yasuji Sakakibara, Hekinan, all of Japan

[73] Assignee: Toyoda Koki Kabushiki Kaisha, Kariya, Japan

[21] Appl. No.: 920,192

[22] Filed: Oct. 17, 1986

[30] Foreign Application Priority Data

Oct. 17, 1985 [JP] Japan .................. 60-231871

[51] Int. Cl.⁴ .............................. B24B 49/02
[52] U.S. Cl. .................. 51/165.71; 51/289 R; 364/474
[58] Field of Search .......... 51/105 SP, 165.71, 165.87, 51/289 R; 364/474

[56] References Cited

U.S. PATENT DOCUMENTS

| 4,584,795 | 4/1986 | Akabane | 51/105 SP |
| 4,584,796 | 4/1986 | Yoneda et al. | 51/105 SP |
| 4,615,149 | 10/1986 | Yoneda et al. | 51/289 R |
| 4,648,025 | 3/1987 | Yoneda et al. | 51/165.71 |

Primary Examiner—Harold D. Whitehead
Attorney, Agent, or Firm—Oblon, Fisher, Spivak, McClelland & Maier

[57] ABSTRACT

A numerically controlled grinding machine equipped with two registers in which data concerning the positions of the cylindrical and shoulder grinding surfaces of a grinding wheel is stored. A reference point is established on the wheel spindle stock. A reference member having two reference surfaces is disposed on the worktable. The machine further includes a manual pulse generator for moving the grinding wheel head and the worktable, detectors for detecting the distances traveled by the wheel head and the worktable, a data entry device, an arithmetic processing unit, and a memory.

4 Claims, 8 Drawing Figures

NUMERICALLY CONTROLLED GRINDING MACHINE

BACKGROUND OF THE INVENTION

1. Field of the Invention

The present invention relates to a numerically controlled grinding machine and, more particularly, to a numerically controlled grinding machine in which a grinding wheel head and a worktable are guided along first and second axes, respectively, that are perpendicular to each other, the machine having a wheel spindle stock mounted so as to be rotatable about its axis on the wheel head, the wheel spindle stock having a grinding wheel rotatably mounted thereon, the grinding wheel having cylindrical and shoulder grinding surfaces which are parallel to the first and second axes, respectively.

2. Description of the Prior Art

Some numerically controlled (NC) grinding machines are equipped with a grinding wheel having a cylindrical grinding surface parallel to the axis of the main spindle and a shoulder grinding surface perpendicular to the cylindrical surface. Such a machine has first and second registers for storing data regarding the present position of the cylindrical grinding surface on the first axis and data regarding the present position of the shoulder grinding surface on the second axis, respectively. The relative movement between the wheel spindle stock and the worktable is controlled according to the contents of the first and second registers.

In this conventional system, after a blackout takes places or the grinding wheel is replaced with another, it is necessary to reset the aforementioned first and second registers and also to make the contents of the two registers correspond to the actual positions of the cylindrical and shoulder grinding surfaces of the grinding wheel. A conventional method for fulfilling these requirements is described in U.S. Pat. No. 4,584,796. Specifically, a reference point is established on the wheel spindle stock. Also, a reference member is mounted on the headstock that is placed on the worktable. The positions of the grinding surfaces of the grinding wheel are determined from the relation between the reference member and the reference point on the wheel spindle stock, in order to appropriately set the contents of the two registers. More specifically, data concerning the distance between the reference member on the worktable and the reference point on the wheel spindle stock when the spindle stock and the worktable are in their home positions is stored in a memory. Then, the cylindrical and shoulder grinding surfaces are brought into contact with reference surfaces formed on the reference member to measure the deviations of the cylindrical and shoulder grinding surfaces from the reference point on the spindle stock. After the home positions are resumed, the positions of the cylindrical and shoulder grinding surfaces are calculated from the data stored in the memory and from the measured deviations. The obtained data is stored in the first and second registers.

The above-described conventional system has the following disadvantage. When the wheel spindle stock is moved back to its home position, a certain positional relationship must exist between the reference point on the wheel spindle stock and the reference member on the headstock. Accordingly, the system cannot be applied to a machine in which the wheel spindle stock rotates about its own axis on the grinding wheel head, so that the position of the reference point on the wheel spindle stock varies. Also, the conventional system cannot be applied to a machine where the headstock is moved on the worktable, resulting in changes in the position of the reference member.

SUMMARY OF THE INVENTION

Accordingly, it is a main object of the present invention to provide an improved, numerically controlled (NC) grinding machine in which the present positions of the cylindrical and shoulder grinding surfaces of the grinding wheel are precisely detected even if the wheel spindle stock revolves on the grinding wheel head or the position of the headstock varies, and in which the obtained data can be entered into two registers.

It is another object of the invention to provide an NC grinding machine which does not require the operator to manually reset the contents of the two registers even if the positions of the cylindrical and shoulder grinding surfaces of the grinding wheel vary.

In summary, in the NC grinding machine according to the invention, a reference point is established on the wheel spindle stock, while a reference member is disposed on the worktable. A pair of reference surfaces is formed on the reference member. The machine has a data entry means for entering the data on the positions of the reference surfaces, the diameter of the grinding wheel, and the angle at which the grinding wheel is inclined. When the grinding wheel is replaced with another, or when the inclination angle of the wheel is varied because of revolution of the wheel spindle stock, the data on the diameter and the inclination angle of the wheel is entered through the data entry means. Then, a numerical controller responds to manually entered instructions, and moves the cylindrical and shoulder grinding surfaces of the wheel from their home positions into contact with the reference surfaces on the reference member. The controller then calculates the deviations of the cylindrical and shoulder grinding surfaces from the reference point on the wheel spindle stock, based on the entered data about the diameter and the inclination angle of the grinding wheel. Subsequently, the controller calculates the distance between the reference point on the worktable and the reference point on the grinding wheel when the wheel spindle stock and the worktable are in their home positions, based on the distances traveled by the spindle stock and the worktable until they come into contact with the reference surfaces on the reference member, and also on the positions of the reference surfaces on the reference member. After the grinding wheel and the worktable return to their home positions, the controller calculates the difference between the distance from the reference point on the worktable to the reference point on the wheel spindle stock and the deviation of the cylindrical grinding surface from the reference point on the wheel spindle stock. Similarly, the difference between said distance and the deviation of the shoulder grinding surface is calculated. The obtained values indicating the present positions of the grinding surfaces are held in the two registers. Thus, even where the NC grinding machine is so designed that the wheel spindle stock revolves on the grinding wheel head, the positions of the grinding surface on the grinding wheel can be precisely detected using the reference member on the worktable. The obtained data is entered into the registers.

In another aspect of the invention, even if a power failure takes place after the grinding wheel has been dressed, the positions of the grinding surfaces of the grinding wheel can be precisely displayed. During dressing operation, the numerical controller changes the deviations of the cylindrical and shoulder grinding surfaces from the reference point on the wheel spindle stock by amounts corresponding to the depth of cut made at the time of the dressing, for correcting the deviations. After the power failure ends, the wheel spindle stock and the worktable are restored to their home positions. Then, the corrected deviations are subtracted by the controller from the difference between the reference point on the worktable and the reference point on the wheel spindle stock when the grinding wheel and the worktable are restored to their home positions. The resulting data is stored in the registers. In this way, the data in the registers precisely represents the positions of the cylindrical and shoulder grinding surfaces after the grinding wheel is dressed

BRIEF DESCRIPTION OF THE DRAWINGS

The above and other objects, features and attendant advantages of the invention will be appreciated as the same becomes better understood by reference to the following detailed description of the preferred embodiment of the invention when considered in connection with the accompanying drawings, in which like reference characters denote like parts in the various views.

DETAILED DESCRIPTION OF THE INVENTION

Figure 1:
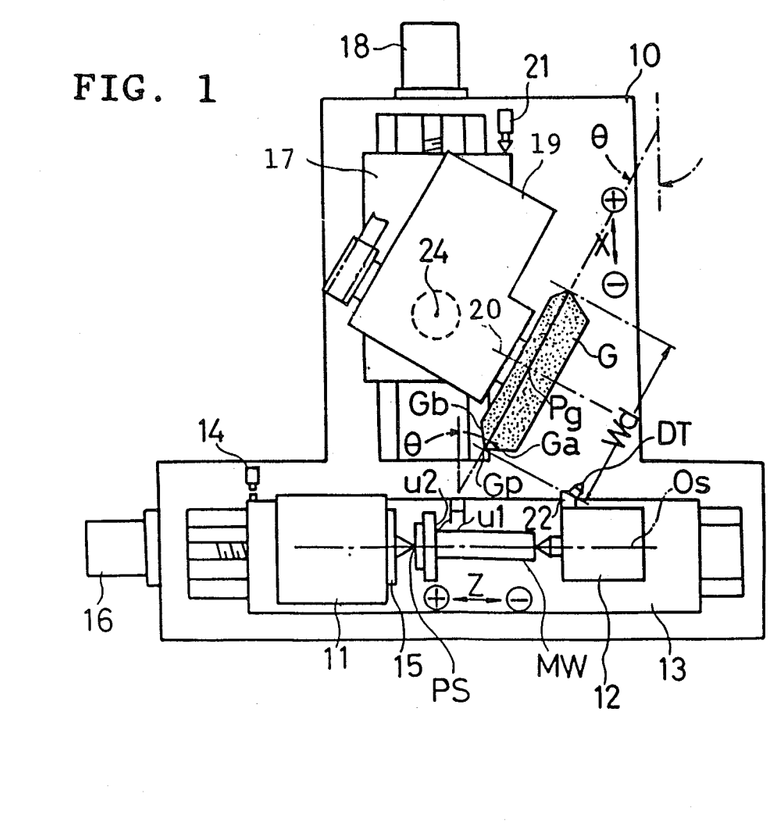
FIG. 1 is a schematic plan view of a numerically controlled grinding machine according to the invention.

Referring to FIG. 1, there is shown a numerically controlled (NC) grinding machine embodying the concept of the present invention. This machine has a bed 10 on which a worktable 13 is placed. A headstock 11 and a tailstock 12 are mounted on the worktable 13, and a workpiece is held between the headstock 11 and the tailstock 12. A main spindle 15 is connected to an electric motor (not shown) to drive the spindle 15. When the spindle 15 is rotated, the workpiece is turned. The headstock 11 is designed to be capable of sliding over the worktable 13. In the illustrated example, a master work MW that is used to establish a new coordinate system is held instead of the workpiece. The worktable 13 is connected to a servomotor 16 via a feed screw mechanism (not shown) to permit the worktable 13 to be moved along Z-axis that is parallel to the axis $O_s$ of the main spindle 15. A Z-axis origin detector 14 is employed to sense that the worktable 13 is located at the origin on the Z-axis.

A grinding wheel head 17 is mounted at the rear of the bed 10 in such a way that the head 17 can move back and forth along X-axis that is perpendicular to the axis $O_s$ of the main spindle. The head 17 is connected to a servomotor 18 via a feed screw (not shown) so that the head can be driven by the motor 18. A wheel spindle stock 19 is pivotally mounted to a shaft 24 so as to be horizontally rotatable about the shaft. A wheel shaft 20 that is rotated by an electric motor (not shown) is mounted to the stock 19. A grinding wheel G of the angular type is mounted on the head 17. The wheel G has a cylindrical grinding surface $G_a$ parallel to the axis $O_s$ of the main spindle and a shoulder grinding surface $G_b$ perpendicular to the surface $G_a$. The tip $G_p$ of the grinding wheel G is located within a plane which is inclined at an angle of $\theta$ to the X-axis. An X-axis origin detector 21 is mounted at the rear end of the bed 10 to sense that the grinding wheel head 17 has been moved back to its home position. A dressing tool DT consisting of diamond or the like is mounted via a bracket 22 on the side of the tailstock 12 that faces the grinding wheel head 17. The grinding wheel G is dressed using the dressing tool DT.

Figure 2:
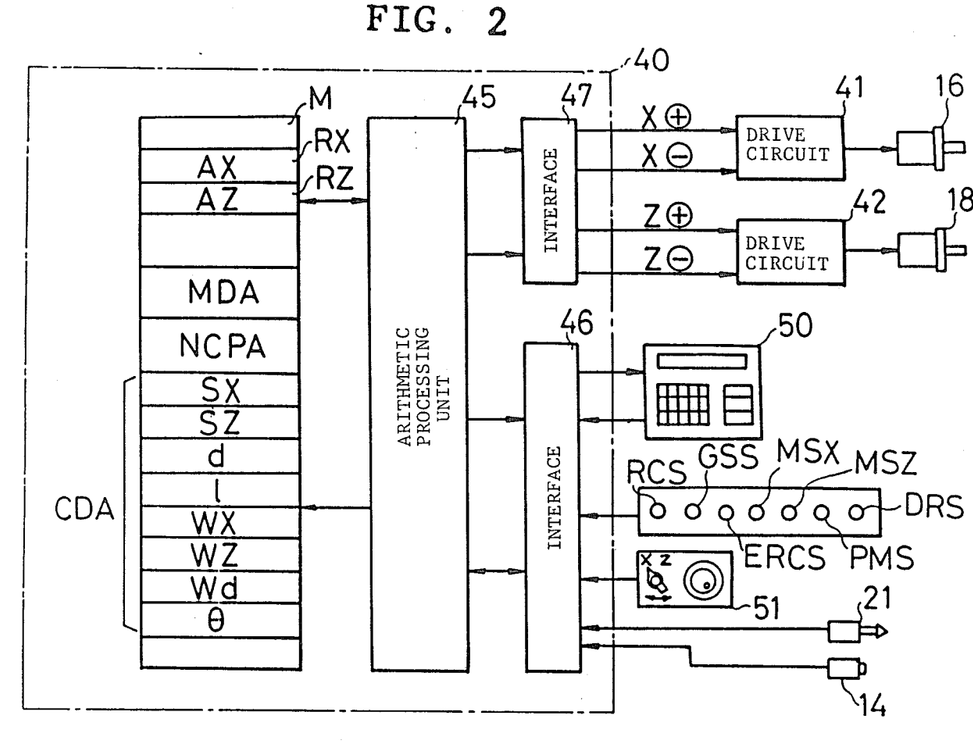
FIG. 2 is a block diagram of a control circuit for controlling machine shown in FIG. 1.

Referring to FIG. 2, there is shown a control circuit for controlling the grinding machine constructed as described above. A numerical controller is generally indicated by numeral 40. Driver circuits 41 and 42 drive the aforementioned servomotors 16 and 18, respectively. The controller 40 distributes pulses to the driver circuits 41 and 42 to control the machining of the workpiece or to control the dressing and truing of the grinding wheel G. The numerical controller 40 comprises an arithmetic processing unit 45, a memory M, interfaces 46 and 47. The interfaces 46 and 47 are connected to the arithmetic processing unit 45. Connected with the interface 46 are a data entry device 50, switches RCS, GSS, MSX, MSZ, and DRS for instructing the beginning of a machining operation and so on, a manual pulse generator 51, and the origin detectors 14, 21. The output of the interface 47 is connected with the driver circuits 41 and 42.

The memory M includes registers RX and RZ for storing data concerning the present position AX of the cylindrical grinding surface $G_a$ on the X-axis and the present position AZ of the shoulder grinding surface $G_b$ on the Z-axis. The positions AX and AZ represent the coordinates of the tip $G_p$ of the grinding wheel G. The memory M further includes a machining data area MDA, an NC program area NCPA, and a control data area CDA. Data about the position at which an indexing operation is perfomred on the worktable 13, the dimensions of the finished surface, the dimensions of the roughly ground surface, etc. is written to the machining data area MDA by the data entry device 50. An NC program for a workpiece grinding cycle and an NC program for dressing and truing the grinding wheel are written to the NC program area NCPA by the data entry device 50. Control data used for the processings performed to establish a coordinate system in accordance with the invention is stored in the control data area CDA. The coordinate system is established by detecting the positions of the cylindrical grinding surface $G_a$ of the wheel G and the shoulder grinding surface $G_b$ and then placing the obtained data into the registers RX and RZ.

Figure 3:
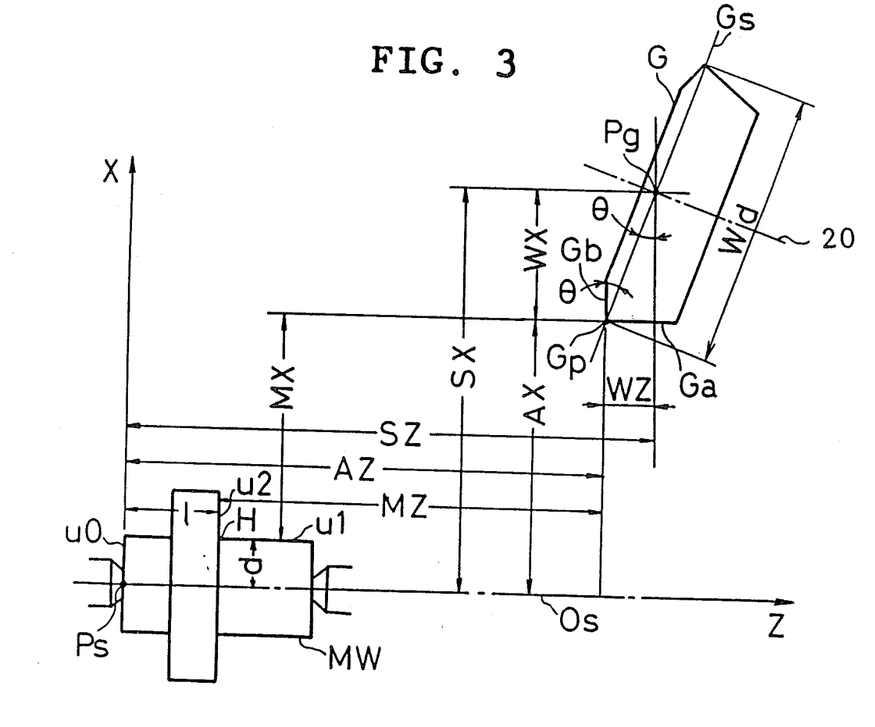
FIG. 3 is a diagram for illustrating the positional relation between the grinding wheel of the machine shown in FIG. 1 and the master work when the wheel spindle stock and the worktable are in their home positions.

FIG. 3 illustrates the relation between various kinds of data which are used for establishing a coordinate system. In the state shown in FIG. 3, the grinding wheel head 17 and the worktable 13 have been returned to their home positions. The intersection point of the axis $O_s$ of the main spindle and the end surface U0 of the master work MW is caused to coincide with a reference point $P_s$ on the worktable 13. This reference point $P_s$ is the origin of the X-Z coordinate system. The master work MW has a first reference surface U1 and a second reference surface U2 that is vertical to the first surface and has a Z coordinate of 1. The first surface U1 is the side surface of a cylinder having a diameter of d, the axis of the cylinder lying on the axis $O_s$ of the main spindle. A reference point H for the master work MW is established on the intersection point (d, 1) of the first reference surface U1 and the second reference surface U2. The grinding wheel G has a diameter of Wd. The coordinates of the tip $G_p$ of the wheel that lies at the intersection line of the cylindrical grinding surface $G_a$ and the shoulder grinding surface $G_b$ are given by (AX, AZ). A reference point $P_g$ on the wheel spindle stock is set at the intersection point of the axis 20 of the grinding wheel and a plane $G_s$. This plane $G_s$ is perpendicular to the axis 20 and passes through the tip $G_p$ of the wheel. When the grinding wheel head and the workpiece are in their home positions, the coordinates of the reference point $P_g$ on the wheel spindle stock, i.e., the distance between the reference point $P_s$ on the worktable and the reference point $P_g$ on the wheel spindle stock, are given by (SX, SZ). The components of the deviation ΔW of the wheel tip $G_p$ from the reference point $P_g$ on the wheel spindle stock are given by (WX, WZ). The shoulder grinding surface $G_b$ and the aforementioned plane $G_s$ form an angle of θ that is equal to the angle at which the axis 20 of the grinding wheel is inclined to the Z-axis.

When the grinding wheel head 17 and the worktable 13 are moved out of their home positions until the cylindrical grinding surface $G_a$ and the shoulder grinding surface $G_b$ come into contact with the first reference surface U1 and the second reference surface U2, respectively, of the master work MW, the components of the amount of movement ΔM are given by (MX, MZ). The following relationships exist between these kinds of data.

$$WX = \cos\theta \cdot Wd/2 \quad (1)$$

$$WZ = \sin\theta \cdot Wd/2 \quad (2)$$

$$SX = d + MX + WX \quad (3)$$

$$SZ = l + MZ + WZ \quad (4)$$

When the wheel head 17 and the worktable are in their home positions, the coordinates $(AX_0, AZ_0)$ of the wheel tip $G_p$ are found from $$AX_0 = SX - WX \quad (5)$$

$$AZ_0 = SZ - WZ \quad (6)$$

Of these kinds of data, the data concerning the coordinates (d, 1) of the reference point H on the master work MW as viewed from the reference point $P_s$ on the worktable is entered into the control data area CDA by the data entry device 50, as well as the data regarding the data on the diameter Wd and the inclination angle θ of the wheel. The area CDA has regions for storing data on the deviation ΔW = (WX, WZ) of the wheel tip $G_p$ from the reference point $P_g$ on the wheel spindle stock and data on the coordinates (SX, SZ) of the reference point $P_g$ as viewed from the reference point $P_s$ on the worktable. The diameter Wd and the deviation (WX, WZ) of the wheel are modified by amounts corresponding to the amount of dressing when the grinding wheel is dressed.

The operation of the NC grinding machine constructed as described above is now described, the description centering on the operation of the arithmetic processing unit 45.

(i) Operations performed when the home positions are resumed.

Figure 6:
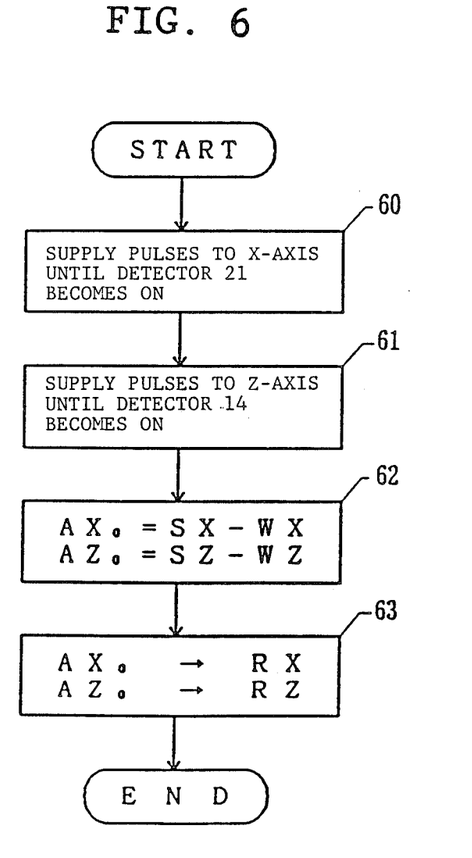
FIG. 6 is a flowchart for illustrating the processings performed by the arithmetic processing unit shown in FIG. 2 when the wheel spindle stock and the worktable are to their home positions.

When the run is resumed after an emergency stop, or when the run is restarted every morning, instruction switch RCS (FIG. 2) is depressed to instruct the arithmetic processing unit 45 to bring the grinding wheel G back to its home position. Then, the unit 45 executes the program shown in FIG. 6. Specifically, the controller 40 supplies positive pulses to the X-axis driver circuit 41 until the origin detector 21 senses that the grinding wheel head 17 and the worktable 13 are located at their home positions shown in FIG. 1 (step 60). Similarly, positive pulses are supplied to the Z-axis driver circuit 42 until the origin detector 14 senses that the head and the worktable are situated at their home positions (step 61). Subsequently, the arithmetic processing unit 45 performs arithmetic operations expressed by formulas (5) and (6) above to find the coordinates of the wheel tip $G_p$ when the head 17 and the worktable 13 are at their home positions (step 62). The obtained coordinates $AX_0$ and $AZ_0$ are input to the registers RX and RZ, respectively, by the unit 45 (step 63). Thus, the contents of the register RX precisely express the amount of the backward movement from the axis $O_s$ of the main spindle to the cylindrical grinding surface $G_a$ when the grinding wheel G is returned to its home position, i.e., the coordinate on the X-axis. The contents of the register RZ precisely express the distance of the shoulder grinding surface $G_b$ from the reference point $P_s$ on the worktable 13 along the Z-axis when the worktable 13 is returned to its home position.

Thereafter, if the grinding wheel head 17 and the worktable 13 are moved according to a numerical control program, then the contents of the registers RX and RZ are modified, corresponding to the amount of movement. Therefore, the contents of the registers RX and RZ precisely represent the present coordinates AX and AZ of the cylindrical grinding surface $G_a$ and the shoulder grinding surface $G_b$, respectively, on the X- and Z-axes, respectively.

(ii) Operations performed when the workpiece is machined or the grinding wheel is dressed.

When machining starting switch GSS (FIG. 2) is depressed, an instruction for starting a machining operation is given to the arithmetic processing unit 45. Then, the unit 45 performs the numerical control processing illustrated in FIG. 7. First, one block of data on the numerical control program is read by the unit 45 (step 70). The data read out is decoded (steps 71–73). If the data instructs movements along the X- and Z-axes, then the flow goes from step 72 to step 75 and then to step 76 or 80. Then, the unit 45 calculates the difference between the data $X_e$ indicating the X coordinate of the final point and the present coordinate AX of the cylindrical grinding surface $G_a$ held in the register RX, the data $X_e$ being contained in the program. Also, the difference between the data $Z_e$ indicating the Z coordinate of the final point and the present coordinate AZ of the shoulder grinding surface $G_b$ is found. Thus, incremental movements $X_i$ and $Z_i$ are calculated (steps 77 and 81). Then, the unit 45 supplies pulses whose numbers are in proportion to the incremental movements $X_i$ and $Z_i$ to the driver circuits (steps 78 and 82).

Figure 7:
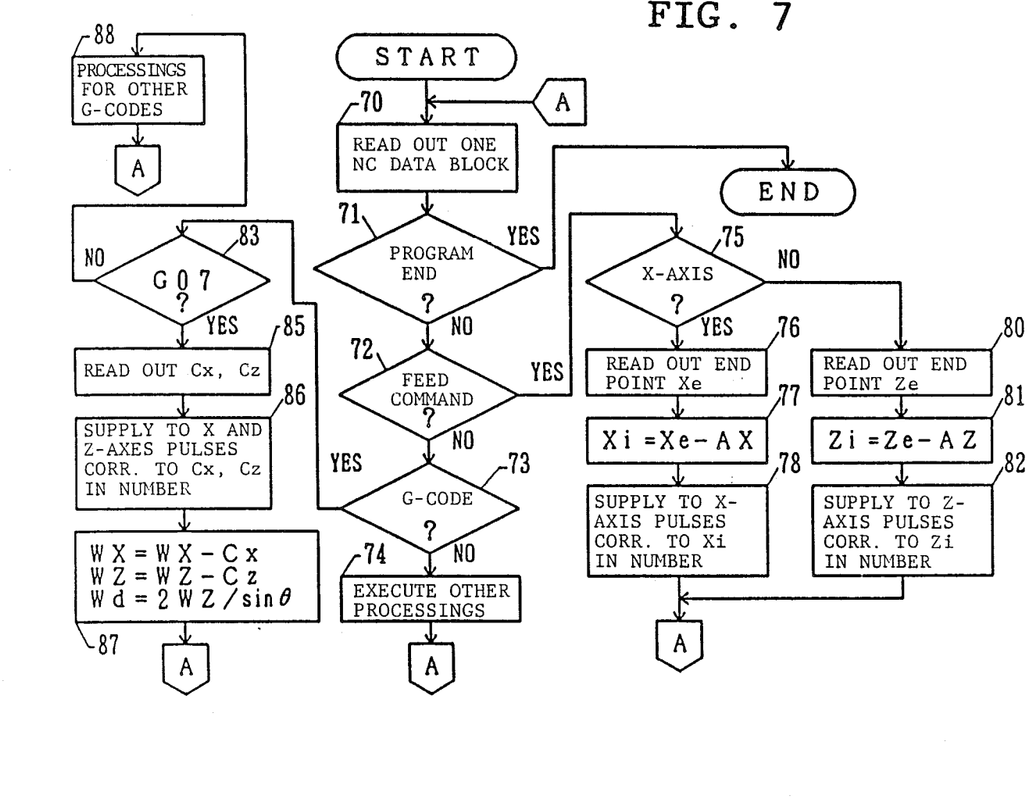
FIG. 7 is a flowchart for illustrating the processings performed by the arithmetic processing unit shown in FIG. 2 when the machine is used for a grinding operation or the wheel is dressed.

The numerical control program for dressing the grinding wheel contains G code G07 at its end, the code instructing a correction of position. When the code G07 is decoded during the execution of this program, the arithmetic processing unit 45 determines whether the decoded data indicates a G code (steps 73 and 83). Then, the flow proceeds to step 85. Thereafter, the components $C_x$ and $C_z$ of a depth of cut made by the dressing tool DT into the cylindrical grinding surface $G_a$ and the shoulder grinding surface $G_b$ are read out (step 85), these components being contained in the program at the position next to the code G07. Then, pulses are supplied to the driver circuits to feed the grinding wheel head 17 and the worktable 13 by the components $C_x$ and $C_z$ of the depth of cut (step 86). Subsequently, the difference between the deviation $W_x$ and the component $C_x$ is calculated, the deviation $W_x$ being stored in the control data area CDA. Also, the difference between the deviation $W_x$ and the component $C_z$ is computed, the deviation being stored in the area CDA. In this way, the components of the deviation of the grinding wheel tip from the reference point $P_g$ on the grinding wheel are modified. Simultaneously, the diameter Wd of the grinding wheel is modified according to the width of modification (step 87).

Consequently, the components of the deviation $W_x$ and $W_z$ coincide with the actual values that result after the grinding wheel is dressed, even if the positions of the grinding surfaces $G_a$ and $G_b$ vary because of dressing of the wheel, leading to changes in the deviations of the surfaces $G_a$ and $G_b$ from the reference point $P_g$. Accordingly, if the grinding wheel head 17 and the worktable 13 are returned to their home positions after the grinding wheel is dressed, then the coordinates $(AX_0, AZ_0)$ of the grinding wheel tip $G_p$ are calculated from the modified components $W_x$ and $W_z$ of the deviation. This permits the positions of the cylindrical grinding surface $G_a$ and the shoulder grinding surface $G_b$ to be precisely detected, even if these positions vary because of the dressing of the wheel.

(ii) Operations performed when data is input.

Figure 5:
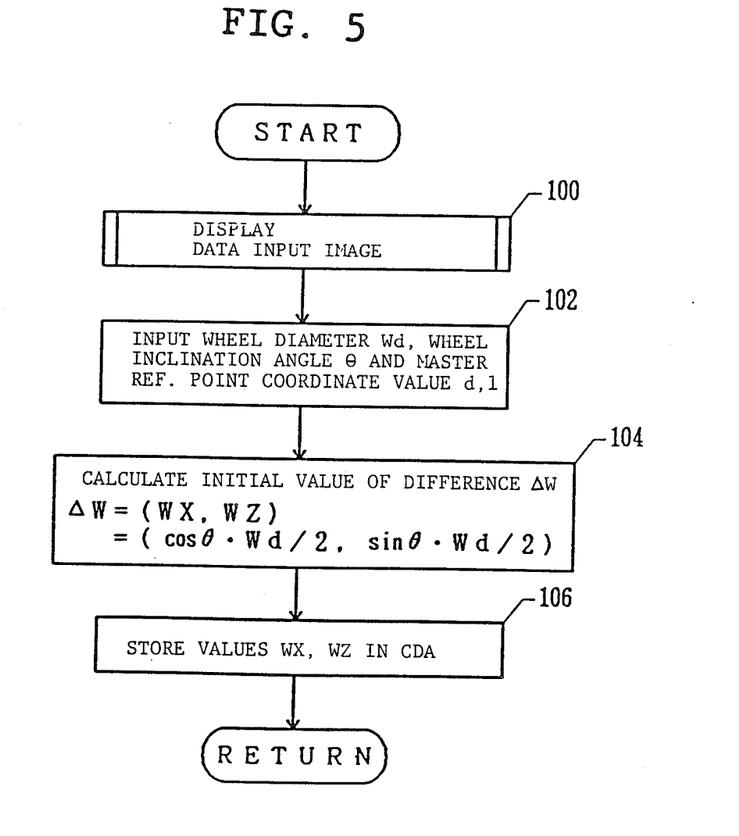
FIG. 5 is a flowchart for illustrating the processings performed by the arithmetic processing unit shown in FIG. 2 when data is entered.

When the grinding wheel G is replaced with another, the coordinate system must be reset. In order to enter the requisite data, data entry instruction switch DRS is depressed. Then, the arithmetic processing unit 45 executes the control data entry program illustrated in FIG. 5. Symbols and figures for entering data are displayed on the viewing screen of the data entry device 50 (step 100). The operator enters data on the diameter Wd and the inclination angle $\theta$ of the wheel and the coordinates (d, 1) of the reference point H for the master work in accordance with the instructions displayed on the screen. The data is written to the arithmetic processing unit 45 (step 102). The unit 45 calculates the initial values of the components of the deviation (WX, WZ) of the wheel tip $G_p$ from the reference point $P_g$ on the grinding wheel, according to the formulas (1) and (2) (step 104). The resulting data is stored in the control data area CDA (step 106).

(iv) Operations performed when a new coordinate system is established.

Figure 4:
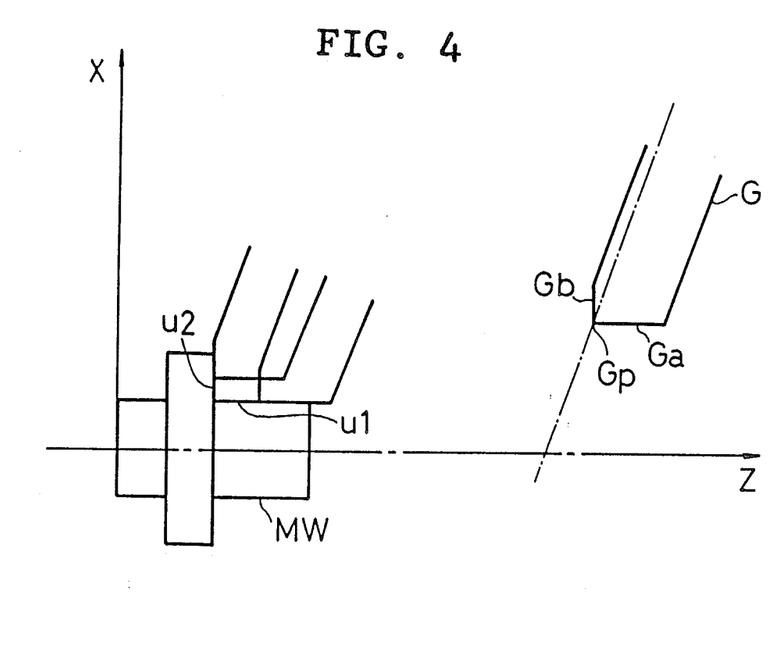
FIG. 4 is a diagram for illustrating the manner in which the cylindrical and shoulder grinding surfaces of the grinding wheel of the machine shown in FIG. 1 are brought into contact with the reference surfaces of the master work.

When the grinding wheel is replaced with another, when the wheel spindle stock is rotated about its own axis, or when the headstock is moved, the diameter of the wheel, the position of the reference point on the wheel spindle stock, or the position of the reference point on the worktable changes. Therefore, it is necessary to establish a new coordinate system. In this case, after (i) mounting a new grinding wheel G, (ii) rotating the wheel spindle stock, or (iii) moving the headstock, the operator enters data in the manner described above if needed. Subsequently, the operator depresses switch ERCS for instructing the setting of a new coordinate system. More specifically, when the diameter Wd of the wheel, the inclination angle $\theta$, or the coordinates of the reference point H on the work vary, the switch ERCS is depressed after entering the data. When none of them change, the switch ERCS is depressed without entering any data. In response to the depression of the switch ERCS, the arithmetic processing unit 45 executes the program illustrated in FIG. 8. First, pulses are distributed to the driver circuits to bring the grinding wheel head 17 and the worktable 13 to their home positions (steps 90 and 91). Then, the registers RX and RZ are reset to 0. Thereafter, the operator moves the worktable 13 and the wheel head 17 using the manual pulse generator 51 to bring the shoulder grinding surface $G_b$ of the wheel, which is now stopped from rotating, into contact with the second reference surface U2 of the master work MW, as shown in FIG. 4. The memory M stores a program for appropriately distributing pulses to the X-axis and Z-axis driver circuits, according to the instructions from the pulse generator 51, and for modifying the contents of the registers RX and RZ according to the amount of movement. When the surface $G_b$ makes contact with the second reference surface U2, the operator depresses position entry switch MSZ to make the arithmetic processing unit 45 store the absolute value of the contents of the register RZ which indicates the Z-axis component MZ of the movement amount of the wheel tip $G_p$ (step 94).

Figure 8:
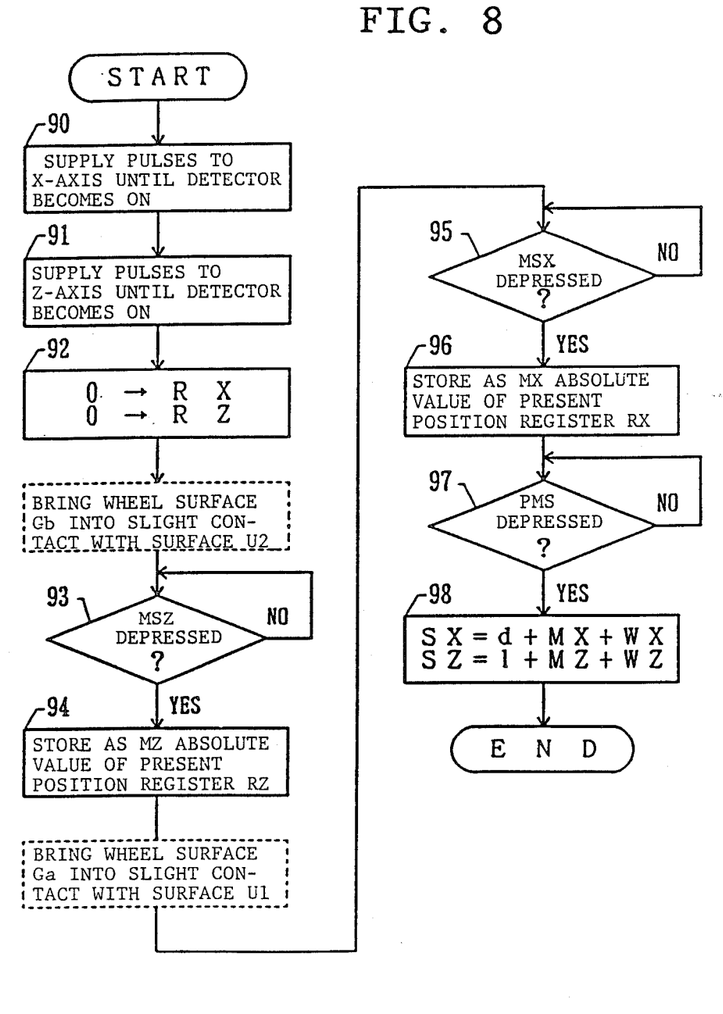
FIG. 8 is a flowchart for illustrating the processings performed by the arithmetic processing unit shown in FIG. 2 either when the grinding wheel is replaced with another or after the direction of the wheel is changed.

Subsequently, the operator operates the manual pulse generator 51 to bring the cylindrical grinding surface $G_a$ of the wheel G into contact with the first reference surface U1 of the master work MW. Then, the position entry switch MSX is depressed (step 95). This causes the arithmetic processing unit 45 to store the absolute value of the contents of the register RX which indicates the X-axis component MX of the movement amount of the wheel tip $G_p$ (step 96). Then, if reference point setting switch PMS is depressed, then the coordinates (SX, SZ) of the reference point on the wheel spindle stock are obtained by the use of formulas (3) and (4) under the condition that the worktable 13 and the grinding wheel head 17 are in their home positions. The obtained data is stored in the control data area CDA of the memory M.

A coordinate system whose origin lies at the reference point $P_s$ on the worktable is set by the processings described above. The coordinates (SX, SZ) indicate the position of the reference point $P_g$ on the wheel spindle stock in this coordinate system when the spindle stock is in its home position. The components of the deviations (WX, WZ) contain errors because the diameter Wd and the inclination angle $\theta$ of the wheel are not completely precisely measured. Therefore, the coordinates of the reference point $P_g$ on the wheel spindle stock contain errors corresponding to the errors described above. However, since the coordinates of the wheel tip $G_p$ are found by calculating the differences between the coordinates of the reference point $P_g$ and their respective deviations as mentioned in item (i) above, the aforementioned errors cancel out. Hence, it is possible to precisely find the position of the wheel tip.

In the above embodiment, the master work is used as the reference member for setting a coordinate system. Instead, a master plate which is mounted on the worktable or the headstock and has a first reference surface parallel to the axis of the main spindle and a second reference surface perpendicular to the first reference surface may be used.

Obviously, many modifications and variations of the present invention are possible in the light of the above teachings. It is, therefore, to be understood that within the scope of the appended claims the invention may be practiced otherwise than as specifically described.

What is claimed is:

1. In a numerically controlled grinding machine having
   a grinding wheel head capable of moving along a first axis,
   a wheel spindle stock held on the grinding wheel head so as to be rotatable about its own axis within a horizontal plane,
   a grinding wheel rotatably mounted on the wheel spindle stock,
   a worktable capable of moving along a second axis perpendicular to the first axis, the worktable holding a workpiece in such a way that the workpiece can rotate about an axis extending parallel to the second axis,
   a first register for storing data concerning the position of the cylindrical grinding surface of the grinding wheel taken on the first axis,
   a second register for storing data concerning the position of the shoulder grinding surface of the grinding wheel taken on the second axis, and
   a feed control means for controlling the movement of the worktable according to the data stored in the first and second registers,
   the improvement comprising:
   manual feed means for moving the grinding wheel head and the worktable out of their home positions to bring the cylindrical and shoulder grinding surfaces of the grinding wheel into contact with first and second reference surfaces, respectively, of a reference member disposed on the worktable, the first and second reference surfaces being parallel to the cylindrical and shoulder grinding surfaces, respectively;
   detecting means for detecting the distances traveled by the grinding wheel head and the worktable from their home positions;
   a data-setting means for setting the positions of the first and second reference surfaces formed on the reference member relative to a reference point on the worktable, the diameter of the grinding wheel, and the angle at which the grinding wheel is inclined to the first axis;
   a deviation-calculating means for calculating the deviations of the cylindrical and shoulder grinding surfaces from the reference point on the wheel spindle stock as measured along the first and second axes, respectively, based on the diameter and the inclination angle of the grinding wheel which are set by the data-setting means;
   a distance-calculating means for calculating the distances between the reference point on the worktable and the reference point on the grinding wheel head along the first and second axes under the condition that the grinding wheel head and the worktable are in their home positions, based on the distances which are traveled by the grinding wheel head and the worktable and are detected by the detecting means, on the positions of the first and second reference surfaces set by the data-setting means, and on the deviations detected by the deviation-calculating means;
   a position-calculating means for calculating the positions of the cylindrical and shoulder grinding surfaces relative to the reference point on the worktable from the distances calculated by the distance-calculating means and from the deviations calculated by the deviation-calculating means; and
   present position-setting means which are operated when the grinding wheel head and the worktable are returned to their home positions and which place the data indicating the positions of the cylindrical and shoulder grinding surfaces into the first and second registers, the positions being calculated by the position-calculating means.

2. In a numerically controlled grinding machine as set forth in claim 1, the further improvement comprising means for correcting the deviations of the cylindrical and shoulder grinding surfaces calculated by the deviation-calculating means, according to the depths of cut into the cylindrical and shoulder grinding surfaces when the grinding surface of the grinding wheel is dressed.

3. In a numerically controlled grinding machine as set forth in claim 2, the further improvement wherein said reference member consists of a master work which is held by the headstock and the tailstock of the machine on the worktable and which has a first reference surface parallel to the cylindrical surface and a second reference surface parallel to the shoulder grinding surface.

4. In a numerically controlled grinding machine as set forth in claim 2, the further improvement wherein said reference member consists of a master plate which is mounted to the headstock on the worktable and which has a first reference surface parallel to the cylindrical grinding surface and a second reference surface parallel to the shoulder grinding surface.

* * * * *